Nov. 1, 1932.   P. U. J. AMYOT   1,885,790

CHUCK

Filed Sept. 19, 1931

Pierre Ulyse Jean Amyot
INVENTOR

By Otto Munk
his Attorney

Patented Nov. 1, 1932

1,885,790

UNITED STATES PATENT OFFICE

PIERRE ULYSE JEAN AMYOT, OF LES GRAS, DOUBS, FRANCE, ASSIGNOR TO LES FILS DE VIRGILE AMYOT, OF LES GRAS, DOUBS, FRANCE, A LIMITED COMPANY OF FRANCE

CHUCK

Application filed September 19, 1931, Serial No. 563,690, and in France January 16, 1931.

The present invention relates to new improvements in chucks.

It has for its object:

(1) to obtain an increasing grip proportional with the resisting forces acting on the object held.

(2) to enable easy release of the work, the releasing effort thereof being inferior to the resisting forces in question.

(3) to ensure easy construction and fitting of the chuck and, by decreasing the number of its parts, to obtain low cost prices.

(4) to enable the play of the inner parts of the chuck to be easily taken up.

(5) to ensure the hold of the gripping parts, this grip increasing in proportion with their distance apart, i. e. with the diameter of the object gripped, and therefore the stress required from them.

(6) to enable the chuck to be tightened or loosened without the use of keys, levers or other accessory tools.

A chuck with which the aforesaid objects can be attained, according to the invention, consists essentially in the essential features described in the following description and defined in the claims at the end thereof.

Two chucks, according to the invention, are illustrated, by way of example, in the accompanying drawing wherein.

Figure 1:
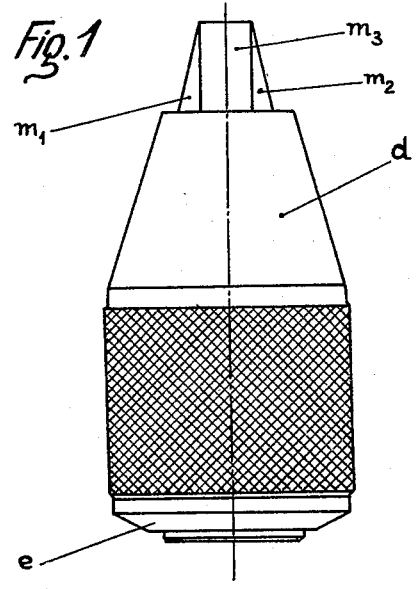
Fig. 1 is an outside elevation of a chuck.
Figure 2:
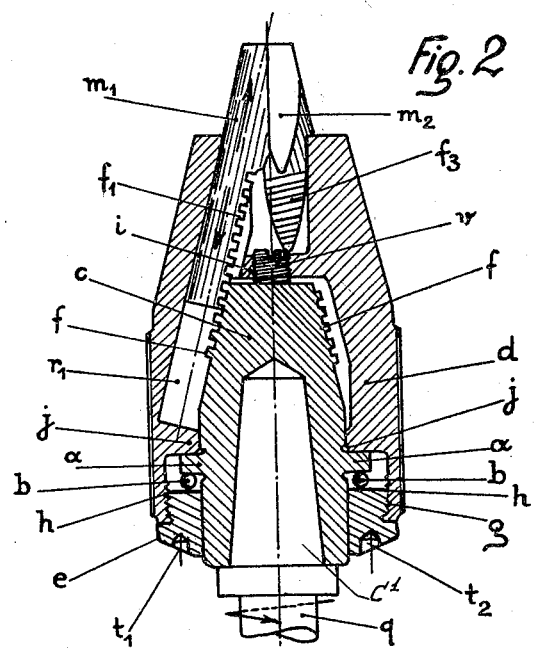
Fig. 2 is a sectional elevation through the axis of the chuck.
Figure 3:
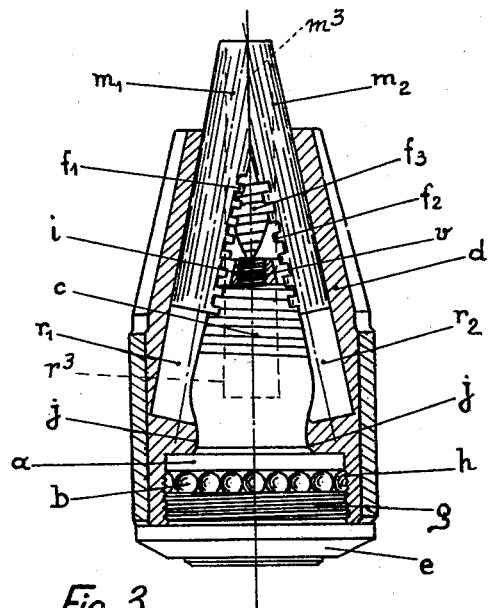
Fig. 3 is an elevation in part section of the chuck, showing the inner parts.

In the chuck shown in Figs. 1 to 3 the central part $c$ is forced onto and grips the shank $g$ which participates in the rotary motion of the machine tool upon which the chuck is fitted. This central part $c$ is suitably threaded and its threads $f$ are engaged by the threads $f^1$, $f^2$, $f^3$, which respectively form part of the jaws $m^1$, $m^2$, $m^3$. These jaws are placed in seatings like $r^1$, $r^2$, suitably formed in the body $d$ of the chuck, the incline of the jaws $m^1$, $m^2$, $m^3$, corresponding to the angle at the top of the cone of part $c$. This part $c$ has a collar $a$ which forms one ball-race for a bearing ball $b$ the other side of this bearing ball resting on the locking nut $e$. This locking nut is threaded at $g$ and the body $d$ of the chuck has corresponding threads at $h$, so that the chuck can be closed at the back by tightening the nut $e$ by means of a tool inserted in the holes $t^1$ and $t^2$.

Finally the body $d$ of the chuck is provided with a flange $i$ into which is inserted the screw $v$ which can, when required, limit and regulate, by its position, the axial movement of the part $c$.

The chuck works as follows: the central threaded part $c$ controls the movements of the jaws $m^1$ $m^2$ $m^3$ by means of the threads $f^1$ engaged with threads $f$ of the said part $c$. This central screwed portion $c$ participates in the motion of the machine tool, upon which the chuck is fitted. The jaws $m^1$, $m^2$, $m^3$, sliding in channels $r^1$, $r^2$, $r^3$, made in the body $d$ of the chuck are moved by relative rotary movement of the parts of the chuck, the effect being, owing to application of the threads $f^1$ etc., against threads $f$ of the part $c$, to cause a gripping effect in direct proportion to the resisting stress in the rotary movement.

This characteristic absolutely ensures a firm grip without any possibility of slipping.

The loosening movement is facilitated remarkably by the absorption of axial reactions by the intervening balls $b$ between all or part of the sliding or turning surfaces in contact, this intervention preventing all jamming between these surfaces and giving a minimum frictional resistance.

Another characteristic of the improved chuck is the facility of stopping or controlling the axial movement of the inner movable parts by employing the screw $v$ forming part of the body $d$ of the chuck and capable of regulating the axial movement of the central threaded part $c$. This screw $v$ can be tightened from the outside after opening the jaws $m^1$, $m^2$, $m^3$. The hole, for the said screw $v$, can also be used for lubrication of the inner parts thereof. If desired, this screw $v$ can be omitted and the central part $c$ can have a suitably placed bearing at its upper end.

It is obvious that the chuck can be assembled or taken apart from the back, by loosening the tightening nut $e$; only the jaws $m^1$, $m^2$, $m^3$, have to be introduced at the front.

The greater the distance apart of the jaws, the greater is the number of threads of these jaws in contact with the corresponding threads of the central part, so that the gripping effect of the jaws increases in proportion to this distance, viz, of the diameter of the object gripped, and thus of the stress to which the jaws $m^1$, $m^2$, $m^3$ are subjected. The central part may have an inner tapered coupling $c^1$, to receive the different kinds of chuck shank in use and enabling the fitting of the said chuck to all types of machine tools.

The improved chuck is opened or closed directly by hand, i. e., its use does not need any key or other accessory for increasing or decreasing the grip.

Numerous alterations can, of course, be made in the aforesaid chuck which is described by way of example.

Figure 4:
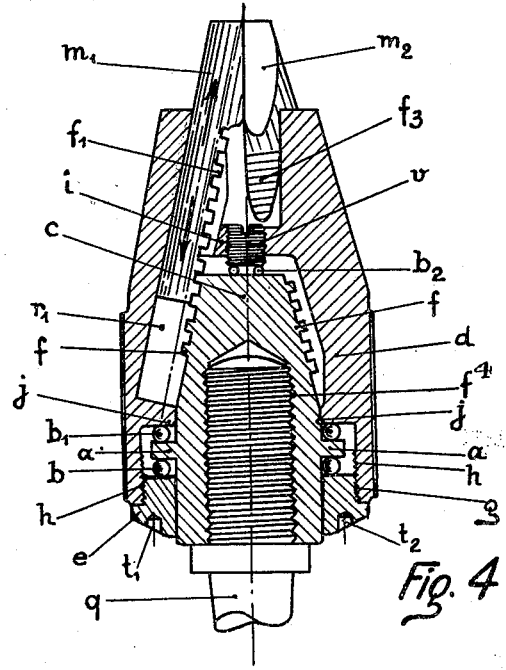
Fig. 4 is an axial section of a modified form of chuck according to the invention.

In particular Fig. 4 represents a chuck according to the invention but in which the central part $c$ has not an inner taper $c^1$ but an internal screw $f^4$. Three sets of bearing balls are provided, one $b$, exactly as already explained with reference to Fig. 2, the other $b^1$, placed between the collar $a$ of the part $c$ and the flange $j$ of the body of the chuck $d$ and finally a third stop, $b^2$, between the central part $c$ and the screw $v$.

What I claim as my invention and desire to secure by Letters Patent is:—

1. A chuck of the character described, comprising a body portion provided with a central cavity having an internal flange to form a seat and a plurality of unobstructed bores surrounding the cavity and following in their relative positions the outline of a cone, locking elements slidably mounted in said bores, a regulating element disposed in the cavity and received in said seat to engage the locking elements, and a regulating screw adjustable in the flange and against the regulating element to control the longitudinal position thereof.

2. A chuck of the character described, comprising a body portion provided with a central cavity having an internal flange to form a seat and a plurality of unobstructed bores surrounding the cavity and following in their relative positions the outline of a cone, locking jaws having threaded portions and being slidably mounted in the said bores, a threaded central cone disposed in the cavity and received in said seat and in mesh with the threads of the jaws to regulate the latter, and a regulating screw carried by the said flange in contact with the cone to control the longitudinal position thereof.

3. A chuck of the character described, comprising a body portion provided with a central cavity having an internal flange to form a seat and a plurality of unobstructed bores surrounding the cavity and following in their relative positions the outline of a cone, locking jaws having threaded portions and being slidably mounted in the said bores, a threaded central cone disposed in the cavity and received in said seat and in mesh with the threads of the jaws to regulate the latter, a ball race and bearing balls interposed between the cone and the body portion of the chuck, and a regulating screw carried by the said flange in contact with the cone to control the longitudinal position thereof.

4. A chuck of the character described, comprising a body portion provided with a central cavity having an internal flange to form a seat and a plurality of unobstructed bores surrounding the cavity and following in their relative positions the outline of a cone, locking jaws having threaded portions and being slidably mounted in said bores, a threaded central cone disposed in the cavity and received in the seat and in mesh with the threads of the jaws to regulate the latter, a screw adjustable in said flange and in contact with the cone to control the longitudinal position thereof.

In testimony whereof I have signed this specification.

PIERRE ULYSE JEAN AMYOT.